UNITED STATES PATENT OFFICE.

AUGUST LEOPOLD LASKA, OF OFFENBACH-ON-THE-MAIN, AND HANS HEINRICH CHRISTIAN PRILLWITZ, OF FRANKFORT-ON-THE-MAIN, GERMANY, ASSIGNORS TO THE CORPORATION OF CHEMISCHE FABRIK GRIESHEIM-ELEKTRON, OF FRANKFORT-ON-THE-MAIN, GERMANY.

NEW LIQUID PHOSPHORIC ESTERS AND PROCESSES OF MAKING SAME.

1,425,392.   Specification of Letters Patent.   Patented Aug. 8, 1922.

No Drawing.   Application filed April 12, 1921. Serial No. 460,762.

*To all whom it may concern:*

Be it known that AUGUST LEOPOLD LASKA and HANS HEINRICH CHRISTIAN PRILLWITZ, both doctors of philosophy and citizens of Germany, with the post-office addresses Offenbach-on-the-Main, Wilhelmsplatz 18, and Frankfort-on-the-Main, Danneckerstrasse 35, respectively, have invented certain new and useful Improvements in New Liquid Phosphoric Esters and Processes of Making Same; and they do hereby declare the following to be a full, clear, and exact description of the invention such as will enable others skilled in the art to which it appertains to make and use the same.

Our invention relates to new liquid phosphoric esters of the general formula:

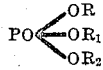

R, $R_1$ and $R_2$ meaning radicles of the benzene series, of which at least two are different, and of which at least one contains an alkyl group in a position, other than para, and of which in the highest one contains an alkyl group in para position relating to the oxygen-atom. They can be obtained by treating a chloride of an arylphosphoric acid with a phenol of the benzene series. Under the term chloride of an arylphosphoric acid we include monochlorides as well as dichlorides. Chlorides of the arylphosphoric acid are known by the works of Jacobsen, published in Ber. d. deutsch. chem. Ges. 8, 1521 and of Rapp, published in Ann. d. Chemie 224, 157. As phenols of the benzene series can be used phenol, ortho-, meta-, para-, cresol or xylenol or higher homologues or their totally or partly hydrogenated derivatives.

Homogeneous phosphoric esters, containing 3 identical molecular porportions of the same phenol united with 1 phosphoric radicle, are already known. Mixed phosphoric esters of the phenols containing various phenols on a phosphoric radicle could not be prepared hitherto and are new products being viscous, almost colourless oils of little fluorescence, liquid at ordinary temperature, which can be distilled at reduced pressure and are, when saponified separated in phosphoric acid and mixtures of phenols. They are excellently suitable for softening agents for the production of plastic artificial bodies.

Our invention is of singular technical value, because the primary compounds for the production of the mixed esters are available in unlimited quantities, the preparation of the hitherto known liquid homogeneous phosphoric esters being possible only in limited quantities on account of the want of the cresols in question.

The production of the new compounds may be illustrated by the following examples, the parts being by weight.

Example 1.

216 parts of meta-cresol are introduced in 154 parts of phosphorus oxychloride, and the mixture is heated at first for some hours at water bath temperature, then at higher temperature until evolution of hydrogen chloride ceases. Then 108 parts of para-cresol are added and then again the mixture is heated at a gradually ascending temperature, until no vapours of hydrochloric acid escape. On fractionating the product of reaction under reduced pressure the ester distills after a little first running, as an almost colourless oil within a few degrees.

The same result is obtained by heating 67, 5 parts of mono-para-cresylic phosphoric chloride (prepared according to Rapp, Annalen der Chemie, 224, 168) with 71 parts of meta-cresol, until the development of hydrochloric acid is finished. The product of reaction is treated with diluted caustic soda lye, well washed with water, dried and subjected to a fractional distillation under reduced pressure. After twice fractionating almost the whole quantity distills as a water-clear oil with bluish fluorescence at 287–289° under pressure of 21 mm.

Example 2.

In the same manner, as described in example 1, the intermediate product from 216 parts of meta-cresol and 154 parts of phosphorus oxychloride is prepared, treated with 94 parts of phenol and the mixture is gradually heated to 250°, until the evolution of hydrogen chloride ceases. By fractional distilling in vacuo the chief product is obtained as a light coloured, heavy oil at 279-282° and 21 mm. pressure.

*Example 3.*

A mixture of 188 parts of phenol and 154 parts of phosphorus oxychloride is heated at first to a moderate, then to a higher temperature, until the evolution of hyrodgen chloride ceases, and after addition of 108 parts of ortho-cresol it is heated anew, until the reaction is finished. By fractionating under reduced pressure the chief product is separated from lower boiling ingredients and treated with diluted caustic soda lye for rectification. Fractionated anew the ester distills at 290-293° and 55 mm. pressure as a light oil of little fluorescence.

*Example 4.*

188 parts of phenol and 154 parts of phosphorus oxychloride are caused to react at first alone and then with 108 parts of meta-cresol in the same manner as described in the preceding example. After working up the product of reaction the ester is obtained as a viscous oil, clear as water, boiling at 306-308° and 60 mm. pressure.

*Example 5.*

In the same manner, as already shown in several examples, 216 parts of ortho-cresol are worked up with 154 parts of phosphorus oxychloride to the intermediate product, which is treated with 108 parts of para-cresol. Rectified with diluted caustic soda lye and fractionated the ester distills at 303-305° and 40 mm. pressure as a colourless, heavy oil.

*Example 6.*

The intermediate product, prepared in the same manner from 216 parts of meta-cresol and 154 parts of phosphorus oxychloride, are treated with 108 parts of ortho-cresol by heating the mixture at 250° until the development of hydrochloric acid ceases. By working up the product of reaction the ester is obtained as an almost colourless oil, boiling at 301-303° at a pressure of 39 mm.

*Example 7.*

In the same manner the intermediate product is prepared from 216 parts of ortho-cresol and 154 parts of phosphorus oxychloride and treated with 108 parts of meta-cresol. In this manner the ester is obtained as an almost colourless heavy oil, boiling at 300-304° at a pressure of 70 mm.

Now what we claim and desire to secure by Letters Patent is the following:

1. As new products the liquid phosphoric esters of the general formula

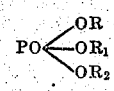

$R$, $R_1$ and $R_2$ meaning radicles of the benzene series, of which at least two are different, and of which at least one contains an alkyl group in a position, other than para, and of which in the highest one contains an alkyl group in para position relating to the oxygen-atom, the liquid phosphoric esters being separated, when saponified, into phosphoric acid on the one side and into mixtures of phenols of the benzene series on the other side, being viscous, almost colourless oils of little fluorescence, liquid at ordinary temperature, which can be distilled at reduced pressure.

2. A process of making the liquid phosphoric esters of the general formula

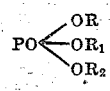

$R$, $R_1$ and $R_2$ meaning radicles of the benzene series, of which at least two are different, and of which at least one contains alkyl group in a position, other than para, and of which in the highest one contains an alkyl group in para position relating to the oxygen-atom, which consists in treating a chloride of an arylphosphoric acid with a phenol of the benzene series in proportions corresponding to the formula above mentioned.

3. As new products the liquid phosphoric esters of the general formula

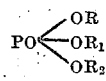

$R$, $R_1$ and $R_2$ meaning radicles of the benzene series, of which at least two are different, and of which at least one contains a methyl group in a position, other than para, and of which in the highest one contains a methyl group in para position relating to the oxygen-atom, the liquid phosphoric esters being separated, when saponified, into phosphoric acid on the one side and into mixtures of phenols of the benzene series on the other side, being viscous, almost colourless oils of little fluorescence, liquid at ordinary temperature, which can be distilled at reduced pressure.

4. A process of making the liquid phosphoric esters of the general formula

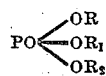

$R$, $R_1$ and $R_2$ meaning radicles of the benzene series, of which at least two are different, and of which at least one contains a methyl group in a position, other than para, and of which in the highest one contains a methyl group in para position relating to the oxygen-atom, which consists in treating a chloride of an arylphosphoric acid with a phenol of the benzene series in proportions corresponding to the formula above mentioned.

5. As new products the liquid phosphoric esters of the general formula

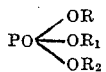

R, $R_1$ and $R_2$ meaning radicles of the benzene series, of which at least two are different and of which two contain a methyl-group in a position, other than para, relating to the oxygen-atom, the liquid phosphoric esters being separated, when saponified, into phosphoric acid on the one side and into mixtures of phenols of the benzene series on the other side, being viscous, almost colourless oils of little fluorescence, liquid at ordinary temperature, which can be distilled at reduced pressure.

6. A process of making the liquid phosphoric esters of the general formula

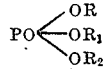

R, $R_1$ and $R_2$ meaning radicles of the benzene series, of which at least two are different and of which two contain a methyl-group in a position, other than para, relating to the oxygen-atom, which consists in treating a chloride of an arylphosphoric acid with a phenol of the benzene series in proportions corresponding to the formula above mentioned.

7. As new products the liquid phosphoric esters of the general formula

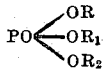

R, $R_1$ and $R_2$ meaning radicles of the benzene series containing a methyl group in a position, other than para, relating to the oxygen-atom, of which at least two are different, the liquid phosphoric esters being separated, when saponified, into phosphoric acid on the one side and into mixtures of cresols on the other side, being viscous, almost colourless oils of a little fluorescence, liquid at ordinary temperature, which can be distilled at reduced pressure.

8. A process of making the liquid phosphoric esters of the general formula

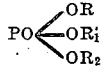

R, $R_1$ and $R_2$ meaning radicles of the benzene series, containing a methyl group in a position, other than para, relating to the oxygen-atom, of which at least two are different, which consists in treating a chloride of a cresyl-phosphoric acid with another cresol in proportions corresponding to the formula above mentioned.

In testimony whereof we affix our signatures.

AUGUST LEOPOLD LASKA.
HANS HEINRICH CHRISTIAN PRILLWITZ.